(12) United States Patent
Watanabe et al.

(10) Patent No.: US 7,799,142 B2
(45) Date of Patent: Sep. 21, 2010

(54) APPARATUS AND METHOD FOR CLEANING A BOARD TERMINAL

(75) Inventors: Masaya Watanabe, Osaka (JP); Shinjiro Tsuji, Nara (JP); Keiji Fujiwara, Osaka (JP); Ryouichirou Katano, Osaka (JP)

(73) Assignee: Panasonic Corporation, Osaka (JP)

( * ) Notice: Subject to any disclaimer, the term of this patent is extended or adjusted under 35 U.S.C. 154(b) by 369 days.

(21) Appl. No.: 11/887,459

(22) PCT Filed: Mar. 30, 2006

(86) PCT No.: PCT/JP2006/306620

§ 371 (c)(1),
(2), (4) Date: Sep. 28, 2007

(87) PCT Pub. No.: WO2006/106803

PCT Pub. Date: Oct. 12, 2006

(65) Prior Publication Data

US 2009/0065029 A1    Mar. 12, 2009

(30) Foreign Application Priority Data

Apr. 1, 2005    (JP) ............................. 2005-105943

(51) Int. Cl.
*B08B 1/04*    (2006.01)
(52) U.S. Cl. ............................. 134/6; 134/15
(58) Field of Classification Search .................. 134/6, 134/15; 15/97.1, 102
See application file for complete search history.

(56) References Cited

U.S. PATENT DOCUMENTS 4,953,252 A    9/1990    Akisawa

FOREIGN PATENT DOCUMENTS

| JP | 2-91295 | 3/1990 |
|----|---------|--------|
| JP | 2001-259540 | 9/2001 |
| JP | 2002-254039 | 9/2002 |
| JP | 3445709 | 6/2003 |

OTHER PUBLICATIONS

International Search Report (in English language) issued Jul. 4, 2006 in PCT/JP2006/306620 of which the present application is the U.S. National Stage.
Patent Cooperation Treaty (PCT) International Preliminary Report on Patentability, issued Oct. 3, 2007.

*Primary Examiner*—Michael Kornakov
*Assistant Examiner*—Natasha Campbell
(74) *Attorney, Agent, or Firm*—Wenderoth, Lind & Ponack, L.L.P.

(57) ABSTRACT

A board terminal cleaning apparatus for cleaning a terminal portion by bringing a cleaning member in contact with the terminal portion of a board comprises a first support member that supports the cleaning member in a first position, a second support member that supports the cleaning member in a second position, a cleaning head that pressurizes part of the cleaning member supported between the first position and the second position by bringing the part in contact with the terminal portion of the board, a support member moving unit that moves the first support member and the second support member in the direction along the terminal portion, and a cleaning head moving unit that moves the cleaning head in the direction along the terminal portion at a second movement velocity different from the first movement velocity of the first support member and the second support member by the support member moving unit.

2 Claims, 13 Drawing Sheets

APPARATUS AND METHOD FOR CLEANING A BOARD TERMINAL

TECHNICAL FIELD

The present invention relates to board terminal cleaning apparatuses for cleaning terminal portions of boards and relates, in particular, to an LCD panel terminal cleaning apparatus and a board terminal cleaning method for cleaning an LCD panel mounting terminal surface to improve the mounting quality of an IC and the like on the mounting terminal surface of an LCD panel as the board.

BACKGROUND ART

In recent years, there has been a fast growing demand for LCD panels, and it is strongly demanded to improve the quality and yield of LCD panels. Under the circumstances, it is effective to perform cleaning (washing or cleaning) of a mounting surface immediately before a mounting process for the improvement in the quality and yields of LCD panels in the mounting process. Therefore, there is an increasing concern for an LCD panel terminal cleaning apparatus.

The structure of a conventional LCD panel terminal cleaning apparatus (see, for example, Japanese Patent No. 3445709) is herein described below. In the conventional cleaning apparatus, a pair of clamp jaws constructed into a shape such that the portions hold the terminal portion of an LCD panel therebetween from both sides and a belt-shaped cleaning cloth that is fed and placed along the inside of the clamp jaws are provided. By gripping the front and back surfaces of the terminal portion of the LCD panel by the clamp jaws via the cleaning cloth and moving the clamp jaws along the belt-shaped terminal portion while keeping the grip state to wipe off particles, oil content and the like that adhere to the front and back surfaces of the terminal portion can be wiped off with the cleaning cloth, allowing the terminal portion to be cleaned.

DISCLOSURE OF INVENTION

Problems to be Solved by the Invention

In recent years, such an LCD panel has been increased in size, and the cleaning region of the terminal portion subjected to wipe cleaning with a cleaning cloth has been upsized in accordance with it. However, in the structure of the conventional cleaning apparatus as described above, same portion of the cleaning cloth is to be brought in contact with the terminal portion from the start to the end of the wipe cleaning for the terminal portion. This sometimes causes a trouble that the soil wiped off once is spread by the increase in scale of the cleaning region of the terminal portion and make the soil readhere to the terminal portion from the cleaning cloth. Moreover, also because of the high degree of the cleaning cloth's becoming dirty through one-time cleaning operation due to the increase in scale of the cleaning region as described above, the problem of the readhesion of soil is significant. In this case, there is an issue that the qualitative improvement in the mounting process of the LCD panel is impaired.

An object of the present invention is to solve the above-mentioned problem and provide a board terminal cleaning apparatus in which a belt-shaped cleaning member is brought in contact with a terminal portion formed in a strip shape on a surface of a board to perform cleaning of the terminal portion, the apparatus being capable of reliably preventing the readhesion of soil from the cleaning member to the terminal portion and achieving an efficient satisfactory cleaning process and a board terminal cleaning method.

Means for Solving the Subject

In accomplishing these and other aspects, the present invention is constructed as follows.

According to a first aspect of the present invention, there is provided a board terminal cleaning apparatus for cleaning a terminal portion formed in a strip shape on a surface of a board by moving a belt-shaped cleaning member along the terminal portion while bringing the cleaning member in contact with the terminal portion, the device comprising:

a board support unit for placing and supporting the board;

a first support member for supporting the cleaning member in a first position that is spaced apart from the surface of the terminal portion of the board supported by the board support unit;

a second support member for supporting the cleaning member in a second position that is spaced apart from the surface of the terminal portion and placed in a direction along the terminal portion from the first position;

a cleaning head for pressing part of the cleaning member supported between the first position and the second position by bringing the part of the cleaning member in contact with the terminal portion of the board;

a support member moving unit for moving the first support member and the second support member integrally relatively to the board in the direction along the terminal portion; and a cleaning head moving unit for moving the cleaning head relatively to the board in the direction along the terminal portion at a second movement velocity different from a first movement velocity of the first support member and the second support member by the support member moving unit.

According to a second aspect of the present invention, there is provided the board terminal cleaning apparatus as defined in the first aspect, wherein the cleaning member brought in contact with the terminal portion is moved along the terminal portion by the movement at the first movement velocity by the support member moving unit, and a contact position of the cleaning head with respect to the cleaning member is varied between the first position and the second position with a movement velocity difference between the second movement velocity by the cleaning head moving unit and the first movement velocity.

According to a third aspect of the present invention, there is provided the board terminal cleaning apparatus as defined in the first aspect, wherein the support member moving unit moves the cleaning head moving unit at the first movement velocity integrally with the first support member and the second support member, and the cleaning head moving unit moves the cleaning head with respect to the first support member and the second support member during the movement by the support member moving unit relatively at a movement velocity of a difference between the second movement velocity and the first movement velocity.

According to a fourth aspect of the present invention, there is provided the board terminal cleaning apparatus as defined in the first aspect, further comprising:

a third support member which is spaced apart from the surface of the terminal portion and for supporting the cleaning member in a third position located in the direction along the terminal portion together with the first support member and the second support member; and a second cleaning head which is provided separately from the first cleaning head and for pressing part of the cleaning member supported between the second support position and the third position by bringing the part of the cleaning member in contact with the terminal portion of the board in the contact position, wherein the support member moving unit integrally moves the first support member, the second support member, and the third support member, and the cleaning head moving unit moves the second cleaning head in the direction along the terminal portion at a third movement velocity different from the first movement velocity.

According to a fifth aspect of the present invention, there is provided the board terminal cleaning apparatus as defined in the fourth aspect, wherein the second movement velocity and the third movement velocity are same movement velocity, and the cleaning head moving unit integrally moves the first cleaning head and the second cleaning head at the second movement velocity.

According to a sixth aspect of the present invention, there is provided the board terminal cleaning apparatus as defined in the first aspect, wherein the cleaning head comprises:

a cleaning-member contact member which is brought in contact with part of the cleaning member while being able to pressurize the terminal portion; and an elevation device for moving up and down the cleaning-member contact member between a pressing height position of the cleaning member with respect to the terminal portion and a pressing release height position spaced apart from the terminal portion.

According to a seventh aspect of the present invention, there is provided the board terminal cleaning apparatus as defined in the sixth aspect, wherein each of the support members is a support roller for supporting the cleaning member while allowing the cleaning member to run, and the cleaning-member contact member of the cleaning head is a contact roller that is movably brought in contact with the cleaning member.

According to an eighth aspect of the present invention, there is provided the board terminal cleaning apparatus as defined in the first aspect, wherein the second movement velocity by the cleaning head moving unit is set greater than the first movement velocity by the support member moving unit.

According to a ninth aspect of the present invention, there is provided the board terminal cleaning apparatus as defined in the first aspect, wherein the first movement velocity and the second movement velocity are set so that a time necessary for the movement of the first support member through a cleaning region of the terminal portion by the support member moving unit becomes shorter than a time necessary for the movement of the cleaning head from the contact position located in the vicinity of the first position to the contact position located in the vicinity of the second position by the cleaning head moving unit.

According to a tenth aspect of the present invention, there is provided the board terminal cleaning apparatus as defined in the first aspect, wherein a pair of the support members and a pair of the cleaning heads are provided via the board while allowing both a front surface and a back surface of the terminal portion to be cleaned, and the pair of the cleaning heads bring the respective cleaning members in contact with the front surface and the back surface in a same position of the terminal portion.

According to an eleventh aspect of the present invention, there is provided the board terminal cleaning apparatus as defined in the tenth aspect, wherein the pair of the support members are moved mutually synchronously at the first movement velocity, and the pair of the cleaning heads are moved mutually synchronously at the second movement velocity.

According to a twelfth aspect of the present invention, there is provided the board terminal cleaning apparatus as defined in the fourth of fifth aspects, wherein the second support member placed between the first support member and the third support member comprises a twisting mechanism which turns inside out a support posture of the cleaning member placed between the second support position and the third support position with respect to a support posture of the cleaning member placed between the first support position and the second support position.

According to a thirteenth aspect of the present invention, there is provided a board terminal cleaning method for cleaning a terminal portion formed in a strip shape on a surface of a board by moving a belt-shaped cleaning member along the terminal portion while bringing the cleaning member in contact with the terminal portion, the method comprising:

moving, in a first position spaced apart from a surface of the terminal portion of the board and a second position spaced apart from the first position in a direction along the terminal portion, the first and second positions and the cleaning member at a first movement velocity with respect to the board while supporting the cleaning member, and at the same time, moving a contact position where part of the cleaning member supported between the first position and the second position is brought in contact with the terminal portion of the board with respect to the board at a second movement velocity different from the first movement velocity in the direction along the terminal portion.

According to a fourteenth aspect of the present invention, there is provided the board terminal cleaning method as defined in the thirteenth aspect, wherein, the first, second and third positions and the cleaning member are moved at the first movement velocity with respect to the board in the direction along the terminal portion while further supporting the cleaning member in a third position which is spaced apart from the surface of the terminal portion and placed in the direction along the terminal portion with the first and second positions, and at the same time, a second contact position where part of the cleaning member supported between the second position and the third position is further brought in contact with the terminal portion of the board is moved with respect to the board at a third movement velocity different from the first movement velocity in the direction along the terminal portion.

Effects of the Invention

According to the present invention, while wiping off the soil that adheres to the surface of the terminal portion by part of the cleaning member by moving the cleaning member supported by the first support member and the second support member at the first movement velocity along the terminal portion by the support member moving unit in a state in which part of the cleaning member is brought in contact with the surface of the terminal portion, the cleaning head with which the part of the cleaning member is brought in contact is moved along the terminal portion at the second movement velocity that is different from the first movement velocity by the cleaning head moving unit, allowing the contact position of the cleaning head to be variable with respect to the cleaning member. That is, the position of the portion of the cleaning member that wipes the terminal portion is changed during the moving process, and the wiping operation can be carried out while bringing a fresh wiping portion consistently in contact with the terminal portion. Therefore, the soil that once adheres to the cleaning member by one-time wiping can be prevented from readhering to the terminal portion by the cleaning member, and highly accurate cleaning operation can be achieved.

BRIEF DESCRIPTION OF DRAWINGS

These and other aspects and features of the present invention will become clear from the following description taken in conjunction with the preferred embodiments thereof with reference to the accompanying drawings, in which.

BEST MODE FOR CARRYING OUT THE INVENTION

Figure 1:
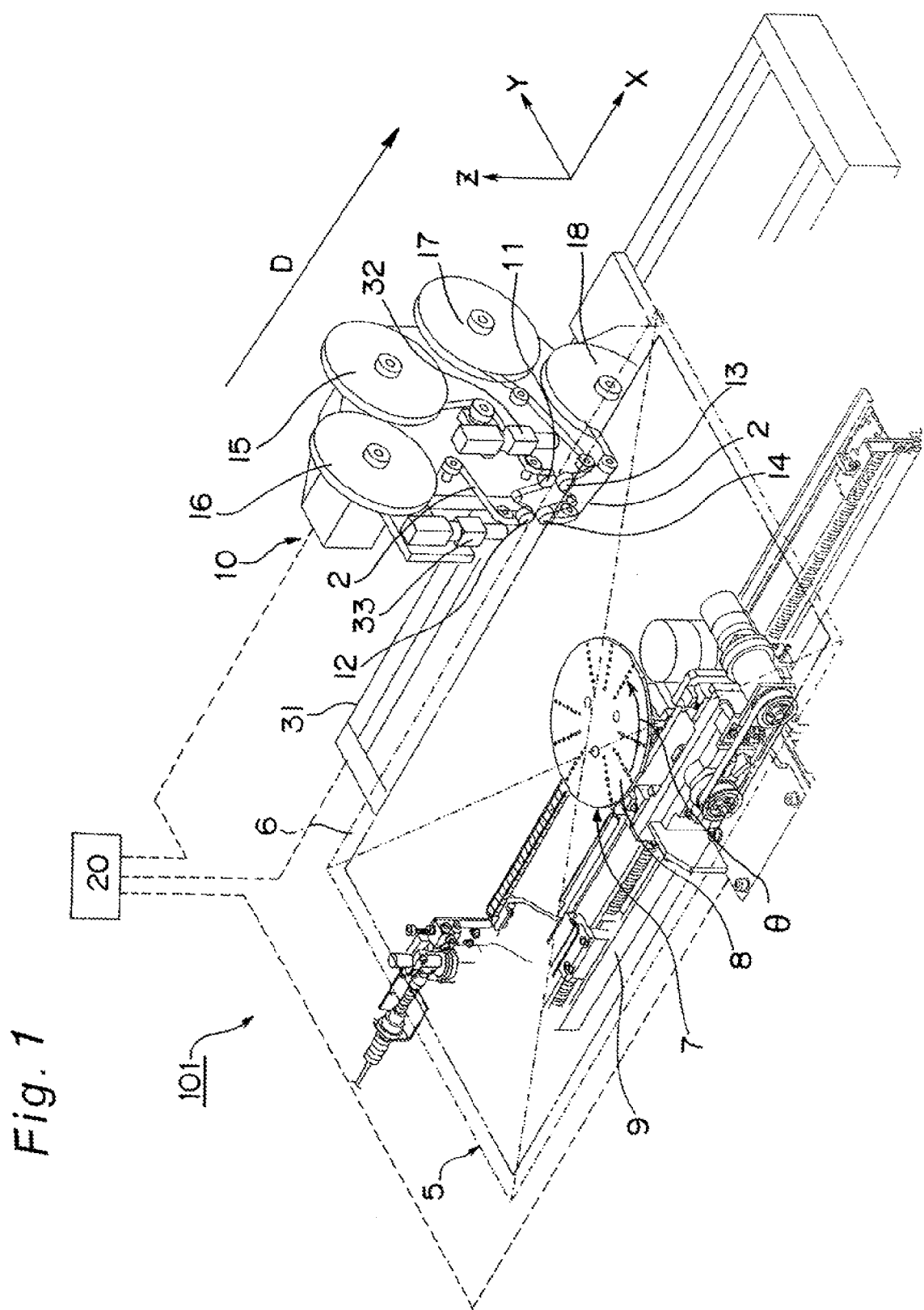
FIG. 1 is a schematic structural view showing the principal structure of a terminal cleaning apparatus according to a first embodiment of the present invention.

Before the description of the present invention proceeds, it is to be noted that like parts are designated by like reference numerals throughout the accompanying drawings.

Hereinbelow, an embodiment of the present invention will be described in detail with reference to the accompanying drawings.

First Embodiment

FIG. 1 shows a schematic perspective view showing the principal structure of a terminal cleaning apparatus 101 of one example of the board terminal cleaning apparatus according to the first embodiment of the present invention. The terminal cleaning apparatus 101 of the present first embodiment is an apparatus that performs cleaning of a terminal portion (or a terminal portion surface or a terminal portion placement region) formed in an edge portion or the like of the surface of a board for a flat display panel such as an LCD device (LCD panel) or a plasma display panel (PDP) by wiping the terminal portion with a cleaning cloth of one example of the cleaning member brought in contact with the terminal portion. In the present specification, the term of "cleaning" means the removal of the soil adhering to the object by washing or cleaning and includes both of wet cleaning that is performed by means of a cleaning cloth soaked with, for example, an organic solvent and dry cleaning that does not use a solvent or the like.

Figure 11:
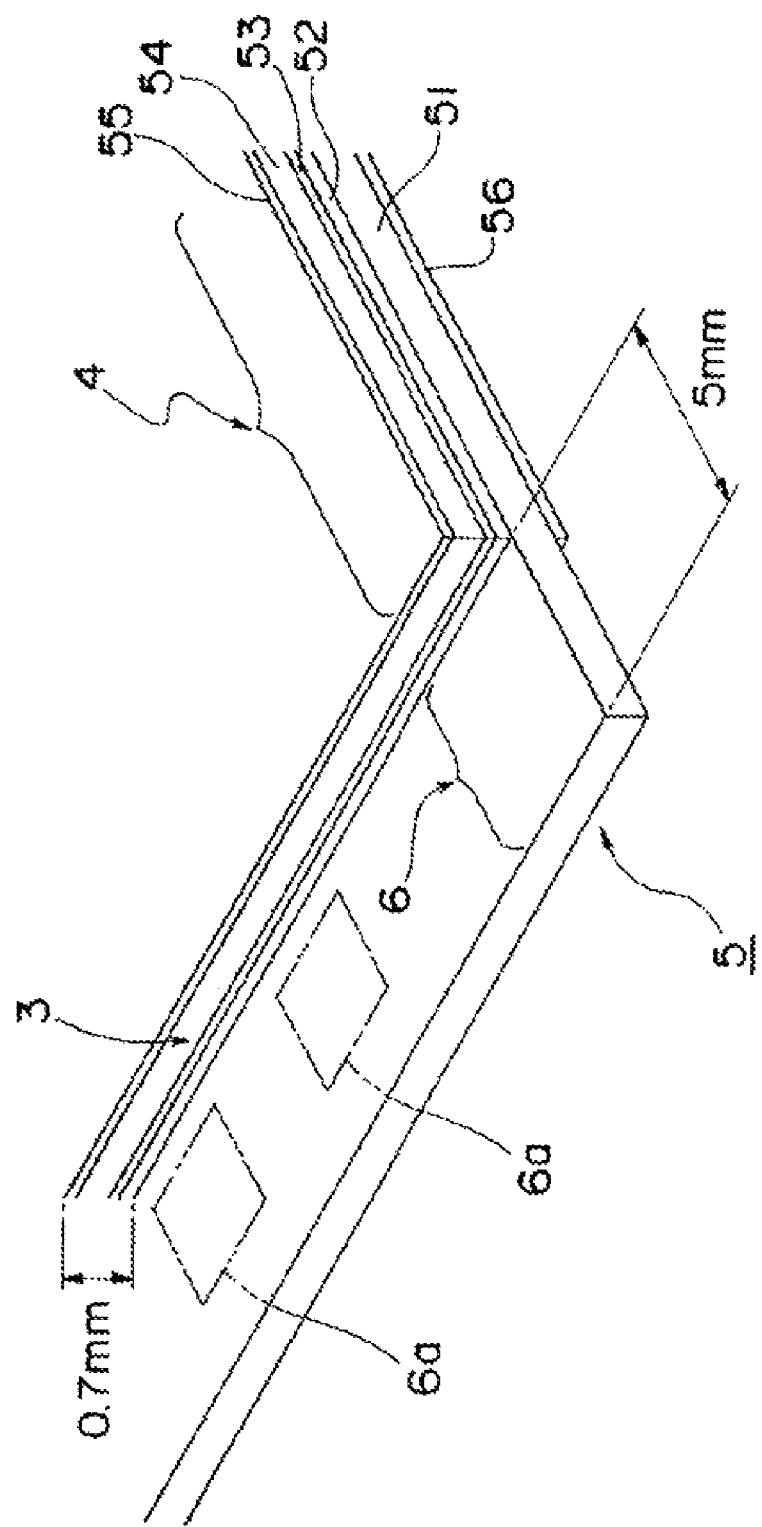
FIG. 11 is a schematic explanatory view showing the structure in the neighborhood of the terminal portion of the board.

In this case, prior to describing the concrete structure of the apparatus, the structure in the neighborhood of the terminal portion of such a board is described with reference to the schematic view shown in FIG. 11. FIG. 11 shows the structure of one example in which a board 5 is an LCD panel.

As shown in FIG. 11, the board 5 has a multilayer structure employing, for example, a glass substrate panel 51 as a base layer. In concrete, an LCD 52, a color filter 53, another glass substrate panel 54 and further a polarizing plate 55 are layered on the illustrated upper surface of the glass substrate panel 51, and a polarizing plate 56 is layered on the illustrated lower surface of the glass substrate panel 51. As described above, the portion that has the structure in which the layers are layered serve as a display portion 4 of the board 5. By applying light by means of a light source such as a back light from the illustrated upper surface side, the desired image or the like can be visibly displayed on the illustrated lower surface side of the display portion 4.

Moreover, as shown in FIG. 11, the glass substrate panel 51 is formed more largely than the other layers and formed so as to protrude from an end portion of the display portion 4. As described above, the surface of the glass substrate panel 51 formed so as to be one step lower than the surface of the display portion 4 serves as an electrode surface at the periphery of the display portion 4, and the portion (region) where the electrode surface is formed as described above serves as a terminal portion 6. At the terminal portion 6, a number of electrode terminals 6a for connecting the board 5 to an external electronic circuit or the like are placed.

For example, a step portion 3 (step portion on the illustrated upper surface side) formed at the boundary between the display portion 4 and the terminal portion 6 has a height of, for example, about 0.7 mm, and the terminal portion 6 formed along the periphery of the display portion 4 has a width (i.e., a length dimension in a direction perpendicular to the lengthwise direction) of, for example, about 5 mm. It is noted that the terminal portion 6 is formed on at least one side of the display portion 4 that has a roughly rectangular shape and is generally formed as a peripheral portion on two sides or three sides of the roughly rectangular shape.

The terminal cleaning apparatus 101 of the present first embodiment is an apparatus that performs cleaning of the surface of the terminal portion 6 on the board 5 that has the structure as described above.

Next, a concrete device structure is described below. As shown in FIG. 1, the terminal cleaning apparatus 101 has a board support stage 7, which releasably holds the board 5 that is conveyed and fed and moves the held board 5 in an X-axis direction or a Y-axis direction that are directions along the surface and in a direction of θ that is a direction of rotation within the surface while allowing positioning operation for the cleaning of the terminal portion 6 on the board 5 to be carried out, and a cleaning unit 10 that carries out a cleaning process for the terminal portion 6 of the board 5 held by the board support stage 7.

The board support stage 7 has a board holder 8 on which the lower surface of the board 5 is placed and releasably sucks and holds the placed board 5 in the vicinity of a center portion of the quadrangular plate-shaped board 5, and a holder-shifter 9 which makes the board holder advance and retreat in the illustrated X-axis direction or Y-axis direction and rotatively moves the board holder 8 in the direction of θ. It is noted that the holder-shifter 9 as described above can be constructed of a drive mechanism employing a ball screw shaft mechanism, a cylinder mechanism or the like. Moreover, the holder-shifter 9 has a mechanism that moves the board holder 8 also in a Z-axis direction perpendicular to the surface of the board 5 in addition to the movement operation in the X-axis direction, the Y-axis direction and the direction of θ as described above. With this arrangement, the board 5 supported by the board support stage 7 can move in all directions, allowing the positioning for the cleaning process to be reliably carried out.

The cleaning unit 10 has a total of four cleaning heads 11 through 14 constituted of the first cleaning head 11 that carries out the cleaning process for the terminal portion 6 on the upper surface side of the board 5 held on the board holding stage 7, the second cleaning head 12 placed adjacent to the first cleaning head 11, the third cleaning head 13 that is arranged so as to be symmetric with the first cleaning head 11 about the board 5 and carries out the cleaning process for the terminal portion 6 on the back surface side, and the fourth cleaning head 14 that is placed adjacent to the third cleaning head 13 and arranged so as to be symmetric with the second cleaning head 12 about the board 5.

Moreover, as shown in FIG. 1, a first cleaning cloth feeding unit 15 that holds a belt-shaped (tape-shaped) cleaning cloth 2 wound around a reel and feeds the cleaning cloth 2 to the first cleaning head 11 and the second cleaning head 12 for the cleaning process, and a first cleaning cloth take-up unit 16 that takes up the cleaning cloth 2 used for the cleaning process by winding the cloth around a reel are provided on the illustrated upper surface side of the cleaning unit 10. Likewise, a second cleaning cloth feeding unit 17 and a second cleaning cloth take-up unit 18 are provided on the illustrated lower surface side of the cleaning unit 10. A string of belt-shaped cleaning cloth 2 is handled between the first cleaning cloth feeding unit 15 and the first cleaning cloth take-up unit 16, and another string of cleaning cloth 2 is similarly handled between the second cleaning cloth feeding unit 17 and the second cleaning cloth take-up unit 18. In the present embodiment, a cleaning cloth made of, for example, a cloth material obtained by weaving synthetic fibers is used as the cleaning cloth 2 and formed into a tape-like shape having a size of 10 to 13 mm in width and 0.3 mm in thickness.

Figure 3:
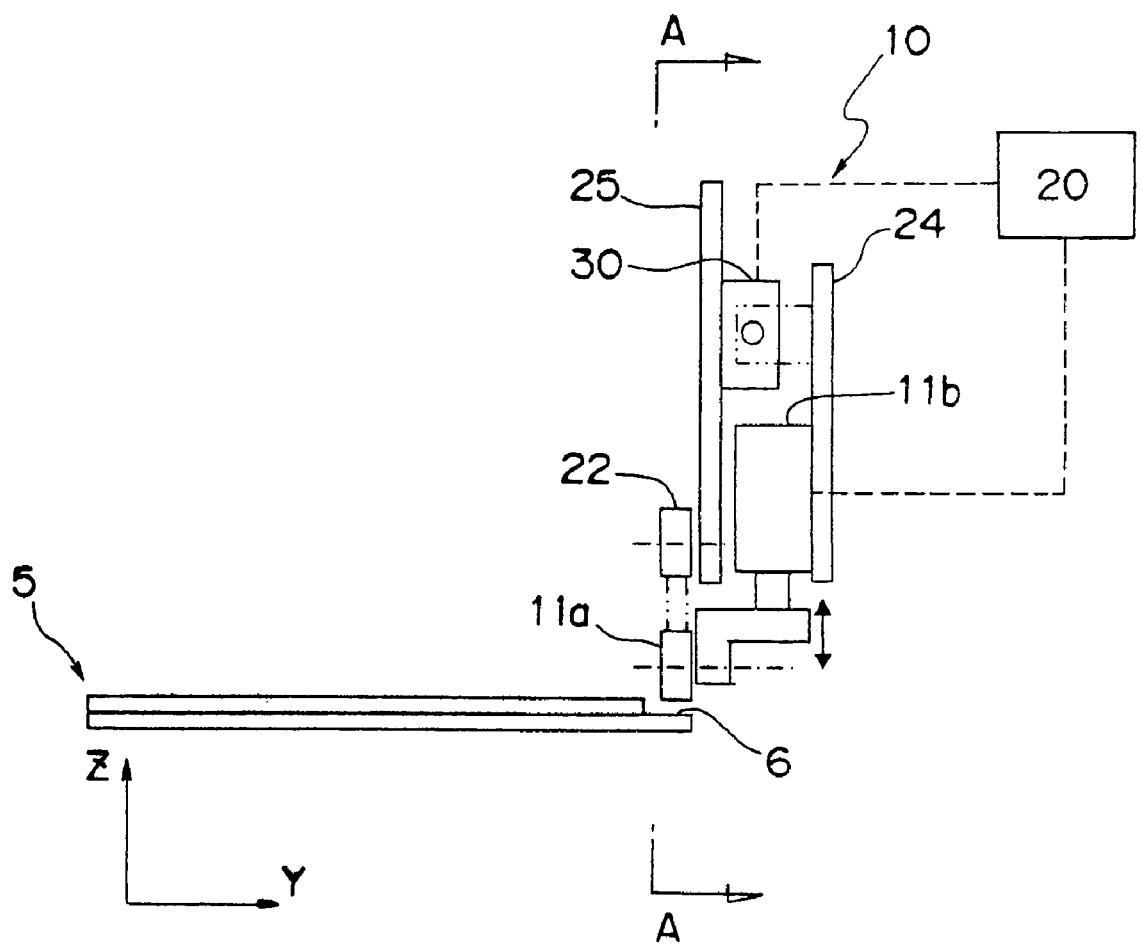
FIG. 3 is a schematic view showing the structure of a cleaning unit provided for the terminal cleaning apparatus of FIG. 1.
Figure 4:
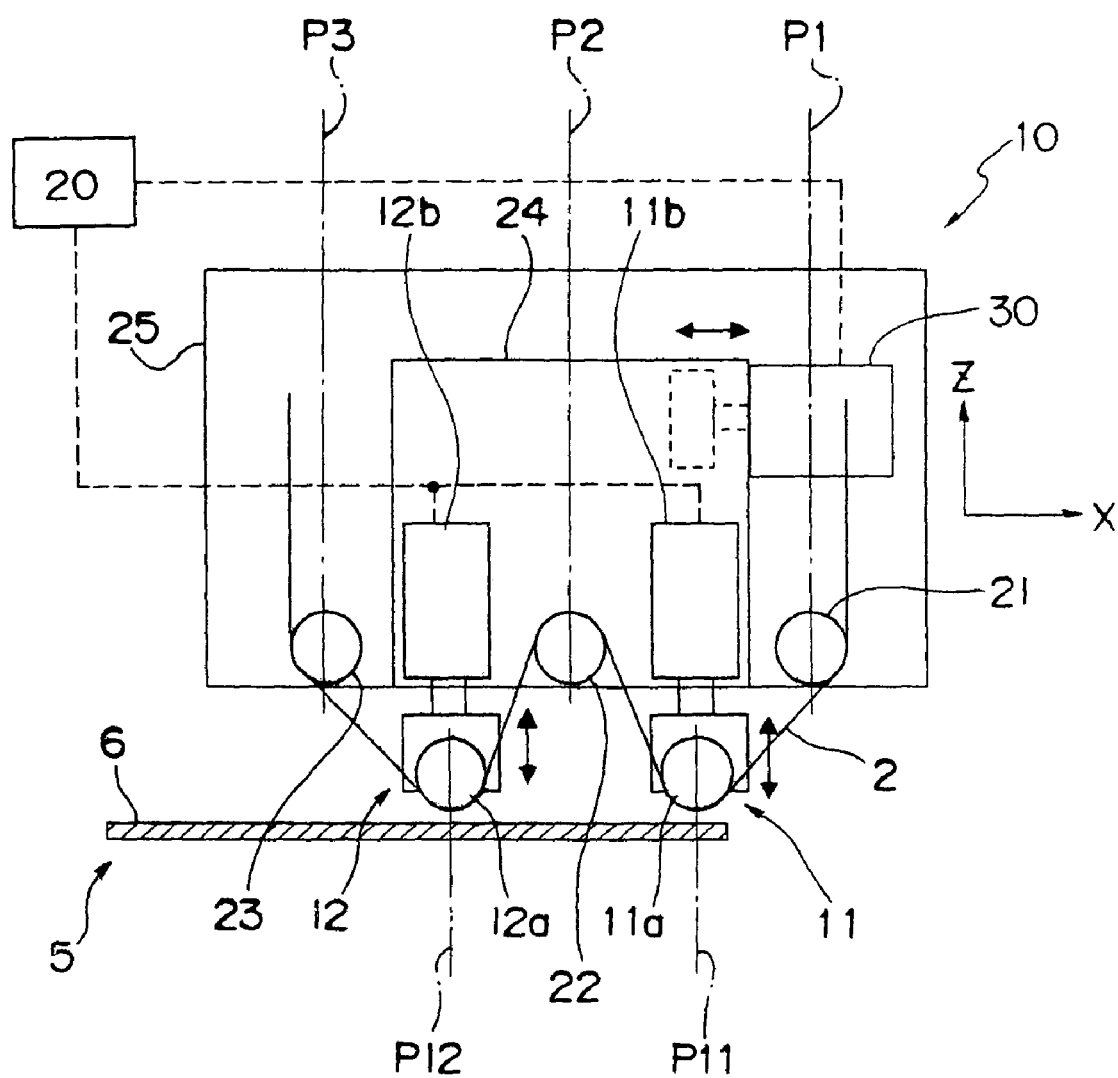
FIG. 4 is a schematic view taken along the arrow line A-A of the cleaning unit of FIG. 3.

In this case, the structure relevant to the first cleaning head 11 and the second cleaning head 12 of the cleaning unit 10 is shown in the schematic structural views of FIGS. 3 and 4. FIG. 3 is a partial schematic side view of the cleaning unit 10 viewed from the illustrated X-axis direction, and FIG. 4 is a view taken along the arrow line A-A in the cleaning unit 10 of FIG. 3. Moreover, in the cleaning unit 10, the first cleaning head 11 and the third cleaning head 13 have structures having symmetrical relations to the second cleaning head 12 and the fourth cleaning head 14, respectively, with respect to the board 5. Therefore, only the structure of the first cleaning head 11 and the second cleaning head 12 is shown as a representative of the structures of the respective cleaning heads in FIGS. 3 and 4, and a description is provided for the structure.

As shown in FIGS. 3 and 4, on the illustrated upper surface side of the cleaning unit 10, three support members (support rollers) of a first roller 21, a second roller 22 and a third roller 23, which guidably support the run along the X-axis direction of the cleaning cloth 2 fed along the illustrated X-axis direction by the first cleaning cloth feeding unit 15 are provided. Moreover, a first position P1 that is a support position of the cleaning cloth 2 by the first roller 21, a second support position P2 that is a support position by the second roller 22 and a third position P3 that is a support position by the third roller 23 are arranged roughly linearly along the X-axis direction.

Moreover, as shown in FIGS. 3 and 4, the first cleaning head 11 is arranged so as to be brought in contact with the illustrated upper surface of the cleaning cloth 2 in a contact position (first contact position) P11 located between the first position P1 and the second position P2 of the cleaning cloth 2 supported by the rollers 21 through 23. Moreover, the second cleaning head 12 is arranged so as to be brought in contact with the illustrated upper surface of the cleaning cloth 2 in a contact position (second contact position) P12 located between the second position P2 and the third position P3. Moreover, the first cleaning head 11 comprises a head roller 11a that serves as one example of the cleaning-member contact member to be brought in contact with part of the cleaning cloth 2 in the contact position P11 and as one example of the contact roller, and an elevating unit 11b that moves the head roller 11a up and down. Likewise, the second cleaning head 12 has a head roller 12a to be brought in contact with part of the cleaning cloth 2 in the contact position P12, and an elevating unit 12b that moves the head roller 12a up and down.

In the first cleaning head 11, the elevating unit 11b has a function for moving up and down the head roller 11a between a pressing height position where the cleaning cloth 2 brought in contact with the head roller 11a is pressurized with a prescribed pressure force by being brought in contact with the terminal portion 6 on the surface of the board 5 and a pressing release height position, i.e., a position where interference with the board 5 is reliably prevented even when the board 5 is moved by the board support stage 7, by reliably releasing the contact between the cleaning cloth 2 and the terminal portion 6. Likewise, in the second cleaning head 12, the elevating unit 12b has a function for moving the head roller 12a up and down between the pressing height position and the pressing release height position. It is noted that the elevating units 11b and 12b can be constructed of, for example, a cylinder mechanism.

Moreover, as shown in FIGS. 3 and 4, in the cleaning unit 10, the elevating units 11b and 12b have their support positions fixed supported to a common frame 24, and a cleaning head moving unit 30 that makes the common frame 24 move advance and retreat along the illustrated X-axis direction is further provided. Moreover, the cleaning head moving unit 30 and the rollers 21 through 23 have their support positions fixed supported to a main frame 25 separated from the common frame 24. By virtue of the cleaning unit 10 having the structure, the head rollers 11a and 11b can be made to advance and retreat in the X-axis direction relatively to the rollers 21 through 23. That is, the contact position P11 of the head roller 11a can freely be varied with respect to the cleaning cloth 2 between the first position P1 and the second position P2, and the contact position P12 of the head roller 12a can freely be varied with respect to the cleaning cloth 2 between the second position P2 and the third position P3. The cleaning head moving unit 30 can be constructed of, for example, a cylinder mechanism. Moreover, in consideration of the movement in contact with the cleaning cloth 2, the head rollers 11a and 12a should preferably have a smooth shape. It is noted that the head rollers and the support rollers are formed of, for example, a resin material.

Moreover, the structure on the upper surface side of the cleaning unit 10 is provided similarly on the lower surface side, making it possible to achieve a relative movement to the rollers of the third cleaning head 13 and the fourth cleaning head 14.

Moreover, as shown in FIG. 1, the terminal cleaning apparatus 101 has a unit-moving unit 31 that serves as one example of the support member moving unit that makes the structure on the upper surface side and the structure on the lower surface side of the cleaning unit 10 advance and retreat in an integrated state in the illustrated X-axis direction. In concrete, the unit-moving unit 31 is able to make the main frame 25 in the structure on the upper surface side and a main frame (not shown) on the lower surface side corresponding to the main frame 25 advance and retreat in a mutually integrated state along the illustrated X-axis direction. It is noted that the unit-moving unit 31 can be constructed of, for example, a ball screw shaft mechanism, and it is preferable to further employ a movement guide rail or the like that guides the movement with high accuracy along the direction of advance and retreat.

By virtue of the unit-moving unit 31 that is able to move the cleaning unit 10 in a direction toward the front side in the illustrated X-axis direction as a cleaning direction D, it is possible to move the cleaning cloth 2 in the cleaning direction D in a state in which the head rollers 11a and 12a are located in the pressing height position and the cleaning cloth 2 is pressurized against the surface of the terminal portion 6 and perform cleaning to wipe the surface of the terminal portion 6. It is noted that the cleaning cloth feeding units 15 and 17 and the cleaning cloth take-up units 16 and 18 in the cleaning unit 10 have a tension applying unit (not shown) that applies a prescribed tension to the cleaning cloth 2, providing a structure in which the cleaning cloth 2 does not become loose in the wiping state.

The cleaning unit 10 further comprises a pre-cleaning confirmation camera 32 that recognizes the degree of soiling of the surface by imaging the surface condition of the terminal portion 6 before the cleaning process is started, and a post-cleaning confirmation camera 33 that recognizes the degree of soiling of the surface by imaging the surface condition of the terminal portion 6 after the cleaning process is carried out.

Moreover, the terminal cleaning apparatus 101 has a controller 20 that executes comprehensive control of holding operation and positional alignment operation of the board 5 by the board support stage 7, operations in the cleaning unit 10, movement operation of the cleaning unit 10 by the unit-moving unit 31 and recognition operation by the confirmation cameras 32 and 33 correlating them with one another.

Figure 2:
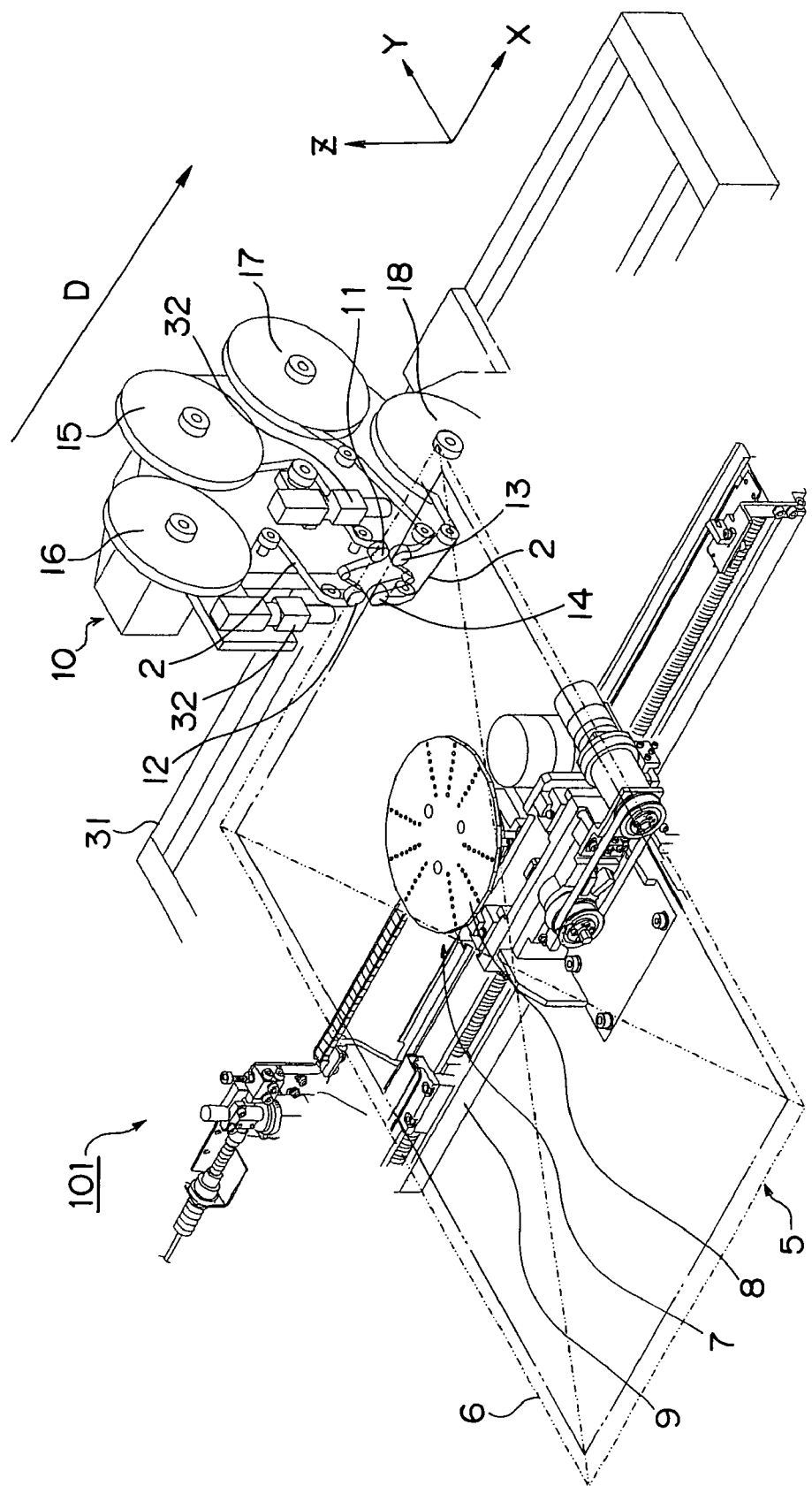
FIG. 2 is a schematic structural view showing a state in which the board holding direction is rotated by an angle of 90 degrees in the terminal cleaning apparatus of the first embodiment.

In the terminal cleaning apparatus 101 shown in FIG. 2, a state in which the board 5 having a rectangular parallelepiped shape is held with the lengthwise direction thereof supported by the board support stage 7 along the illustrated Y-axis direction. As described above, by virtue of the board support stage 7 that is able to support the board 5 in all directions along the surface of the board 5, it is possible to carry out the cleaning process for the terminal portion 6 provided at the edge portions of the entire periphery of the board 5.

Next, the operation of carrying out the cleaning process for the terminal portion 6 of the board 5 in the terminal cleaning apparatus 101 that has the above structure is described below with reference to the schematic explanatory views of FIGS. 5, 6 and 7. It is noted that the cleaning process described below is carried out by executing comprehensive control of the constituent parts by the controller 20 provided for the terminal cleaning apparatus 101 correlating them with one another.

First of all, as shown in FIG. 1, the board 5 to be subjected to the cleaning process is conveyed by a conveyer (not shown) in the terminal cleaning apparatus 101 and placed and held by the board holder 8 of the board support stage 7. Subsequently, by moving the board holder 8 in the illustrated X-axis direction, Y-axis direction, Z-axis direction or θ-axis direction by the holder-shifter 9, positional alignment of the terminal portion 6 to be subjected to the cleaning process with the cleaning unit 10 is performed.

Moreover, concurrently with the positional alignment or before the positional alignment, supply and feed operation and take-up operation of the cleaning cloth 2 are carried out by the cleaning cloth feeding units 15 and 17 and the cleaning cloth take-up units 16 and 18 in the cleaning unit 10, providing a state in which a fresh cleaning cloth 2 is supported by the rollers 21, 22 and 23.

In the first cleaning head 11 and the second cleaning head 12 of the structure on the upper surface side of the cleaning unit 10 after the positional alignment and the feed operation of the cleaning cloth 2 are completed, movement and positioning are carried out by the cleaning head moving unit 30 so that the head rollers 11a and 12a are located on the upstream side in the cleaning direction D, i.e., so that the contact position P11 of the head roller 11a comes close to the second position P2 and the contact position P12 of the head roller 12a comes close to the third position P3. Moreover, in the third cleaning head 13 and the fourth cleaning head 14 of the structure on the lower surface side of the cleaning unit 10, the head rollers are similarly put in a state in which the rollers are positioned on the upstream side in the cleaning direction D.

Moreover, concurrently with the movement, the head rollers 11a and 12a are moved down by the elevating units 11b and 12b in the cleaning heads 11 and 12 of the structure on the upper surface side of the cleaning unit 10, so that the head rollers are positioned from the pressing release height position into the pressing height position. Moreover, similar operation is carried out also in the cleaning heads 13 and 14 of the structure on the lower surface side of the cleaning unit 10, so that the head roller is moved up by an elevating unit (not shown) and positioned from the pressing release height position into the pressing height position. The positional relation of the cleaning unit 10 to the terminal portion 6 of the board 5 in the state as described above is the state shown in the schematic explanatory view of FIG. 5.

Figure 5:
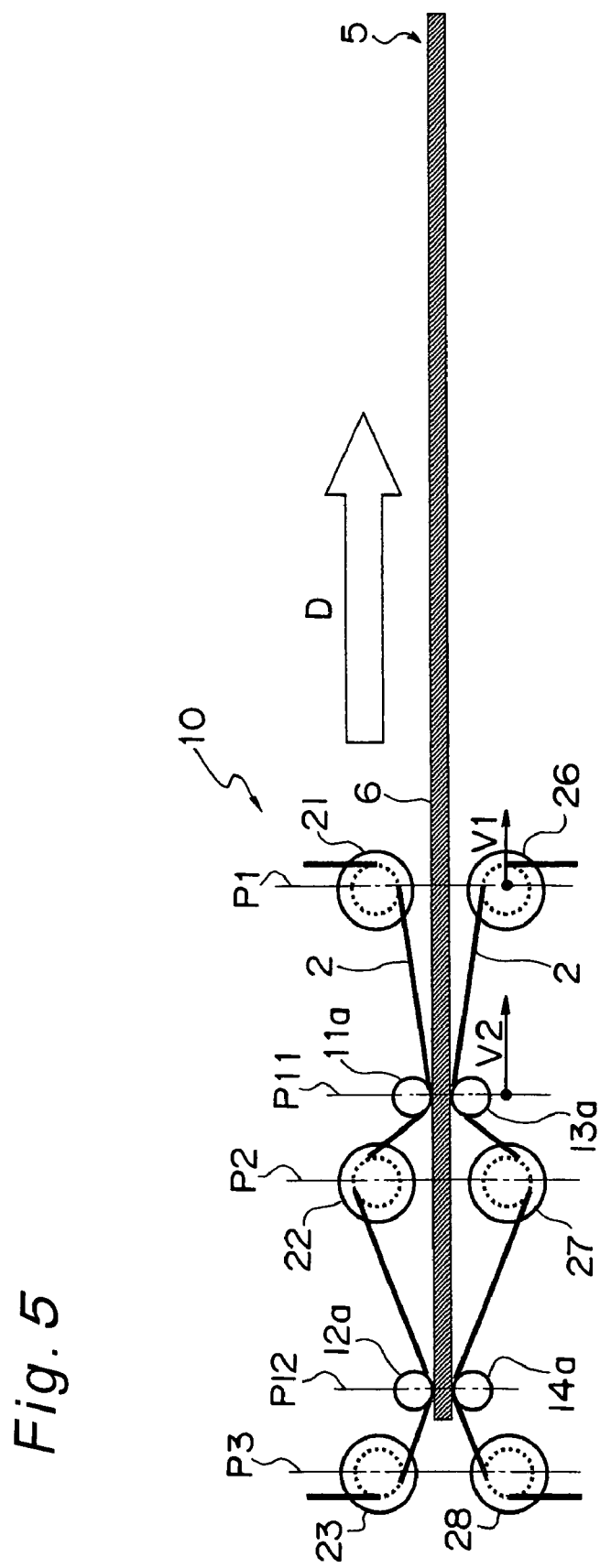
FIG. 5 is a schematic explanatory view showing the operation of a cleaning process in the terminal cleaning apparatus of the first embodiment in a state in which the cleaning process is started.

As shown in FIG. 5, the head roller 11a in the first cleaning head 11 is located in the pressing height position in the direction of height and located in a position close to the second position P2 in the direction along the surface of the board 5.

Moreover, the head roller 12a of the second cleaning head 12 is located in the pressing height position in the direction of height and located in a position close to the third position P3 in the direction along the surface of the board 5. Further, the head roller 13a of the third cleaning head 13 is also located in the pressing height position in the direction of height and located in a position close to the second position P2 in the direction along the surface of the board 5. Then, the head roller 14a of the fourth cleaning head 14 is also located in the pressing height position in the direction of height and located in a position close to the third position P3 in the direction along the surface of the board 5.

Moreover, the cleaning heads 11 through 14 are arranged vertically symmetrically with respect to the board 5 as a plane of symmetry on the upper surface side and the lower surface side of the board 5. That is, the head roller 11a of the first cleaning head 11 and the head roller 13a of the third cleaning head 13 are located in the same position, i.e., the contact position P11 along the surface of the board 5. Moreover, the head roller 12a of the second cleaning head 12 and the head roller 14a of the fourth cleaning head 14 are located in the same position, i.e., the contact position P12 along the surface of the board 5. As described above, by virtue of the symmetrical positional relation owned by the head rollers 11a through 14a with interposition of the board 5, the terminal portion 6 of the board 5 is held between the head rollers 11a and 13a from the front and back surfaces with interposition of the cleaning cloth 2, and the terminal portion 6 of the board 5 is held between the head rollers 12a and 14a from the front and back surfaces with interposition of the cleaning cloth 2.

Next, in the state shown in FIG. 5, the movement of the cleaning unit 10 in the cleaning direction D is started by the unit-moving unit 31. During the movement, the cleaning unit 10 is moved at, for example, a movement velocity V1 (first movement velocity, i.e., movement velocity with respect to the board 5) toward the cleaning direction D. That is, the cleaning cloth 2 supported between the first position P1 and the third position P3 is to move at the first movement velocity V1 in the cleaning direction D as a consequence of the movement. As a result, portions of the cleaning cloth 2 brought in contact with the front surface and the back surface of the terminal portion 6 of the board 5 in the contact positions P11 and P12 are moved toward the cleaning direction D while keeping the contact with the terminal portion 6, so that the front surface and the back surface of the terminal portion 6 are cleaned by being wiped by the cleaning cloth 2. During the movement, the rollers 21, 22, 23, 26, 27 and 28 are brought in a state in which the mutually integrated placement relations are kept on the upper surface side and the lower surface side of the board 5.

Concurrently with the start of the movement of the cleaning unit 10 by the unit-moving unit 31, the movement of the common frame 24 toward the cleaning direction D by the cleaning head moving unit 30 is started. In concrete, as shown in FIG. 6, in the structure on the upper surface side of the cleaning unit 10, the movement by the cleaning head moving unit 30 is performed at a movement velocity V2 so as to move the head roller 11a that has been located in the position close to the second position P2 toward the first position P1 and move the head roller 12a that has been located in the position close to the third position P3 toward the second position P2. Moreover, also in the structure on the lower surface side, the movement by the cleaning head moving unit 30 is performed so as to move the head roller 13a that has been located in the position close to the second position P2 toward the first position P1 and move the head roller 14a that has been located in the position close to the third position P3 toward the second position P2 in synchronization with the movement of the structure on the upper surface side of the cleaning unit 10.

By performing the movement by the cleaning head moving unit 30 as described above, the contact positions P11 and P12 of the head rollers 11a through 14a with respect to the cleaning cloth 2 are varied. In detail, reference is made to the cleaning cloth 2 supported between, for example, the first position P1 and the second position P2. While part of the cleaning cloth 2 is moved toward the cleaning direction D at the movement velocity V1 in contact with the surface of the terminal portion 6 in the position P11, the contact position P11 is further moved toward the first position P1 at the movement velocity V2 in the movement state. Therefore, the contact portion of the cleaning cloth 2 brought in a contact with the surface of the terminal portion 6 can consistently be a fresh clean portion.

Reference is made to the movement state in relation to a movement velocity Va of the rollers 21 through 23 and 26 through 28 with respect to the board 5 and a movement velocity Vb (second movement velocity) of the head rollers 11a through 14a with respect to the board 5. The movement of the roller in the cleaning direction D is performed at a velocity Va=V1, and the movement of the head roller in the cleaning direction D is performed at a velocity Vb=V1+V2.

Figure 7:
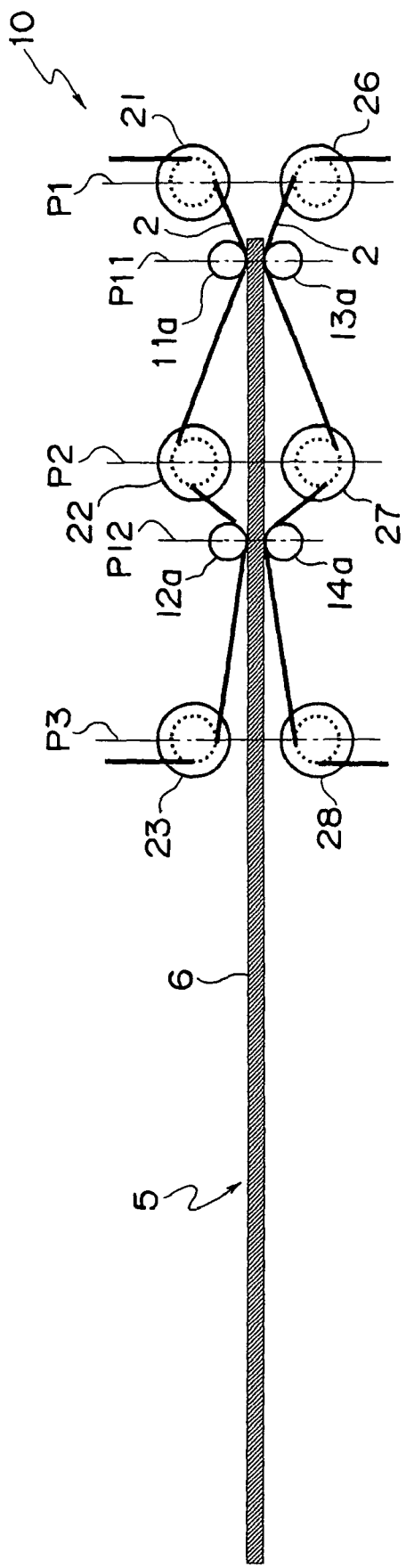
FIG. 7 is a schematic explanatory view showing the operation of the cleaning process in the terminal cleaning apparatus of the first embodiment in a state in which the cleaning process is completed.

Subsequently, when the head roller 11a of the first cleaning head 11 and the head roller 13a of the third cleaning head 13 reach the end portion of the terminal portion 6 in the cleaning direction D as shown in FIG. 7, the movement of the cleaning unit 10 by the unit-moving unit 31 is stopped. Moreover, in the above state, the head roller 11a of the first cleaning head 11 and the head roller 13a of the third cleaning head 13 are moved to a position close to the first position P1, and the head roller 12a of the second cleaning head 12 and the head roller 14a of the fourth cleaning head 14 are moved to a position close to the second position P2. In the above state, the movement by the cleaning head moving unit 30 is also stopped.

Subsequently, in the cleaning heads 11 through 14, the head rollers 11a through 14a are moved from the pressing height position to the pressing release height position by the elevating unit, so that the contact of the cleaning cloth 2 with the front and back surfaces of the terminal portion 6 is released. When the contact of the cleaning cloth 2 is released as described above, the feeding operation and the take-up operation of the cleaning cloth 2 are carried out by the first cleaning cloth feeding unit 15 and the first cleaning cloth take-up unit 16, so that the cleaning cloth 2 in the portion brought in contact with the terminal portion 6 between the first position P1 and the third position P3 is replaced with a fresh cleaning cloth 2. Similar operation is also carried out in the second cleaning cloth feeding unit 17 and the second cleaning cloth take-up unit 18, carrying out the operation to replace the used portion of the cleaning cloth 2 with an unused portion.

Subsequently, in the terminal cleaning apparatus 101, by rotating the board holder 8 by, for example, 90 degrees in the direction of θ by the holder-shifter 9 and moving the portion 8 in the X-, Y- or Z-axis direction, the positional alignment of the terminal portion 6 at a different edge of the board 5 with the cleaning unit 10 is performed. After the positional alignment, the cleaning process of the different terminal portion 6 is carried out according to a procedure similar to that described hereinabove.

When the cleaning process of all the terminal portions 6 of the board 5 is completed, the holding of the board 5 by the board support stage 7 is released, the board 5 is transported to a conveying device (not shown), and the board 5 is discharged. The sequential cleaning process of the terminal portion 6 of the board 5 is thus completed.

Figure 6:
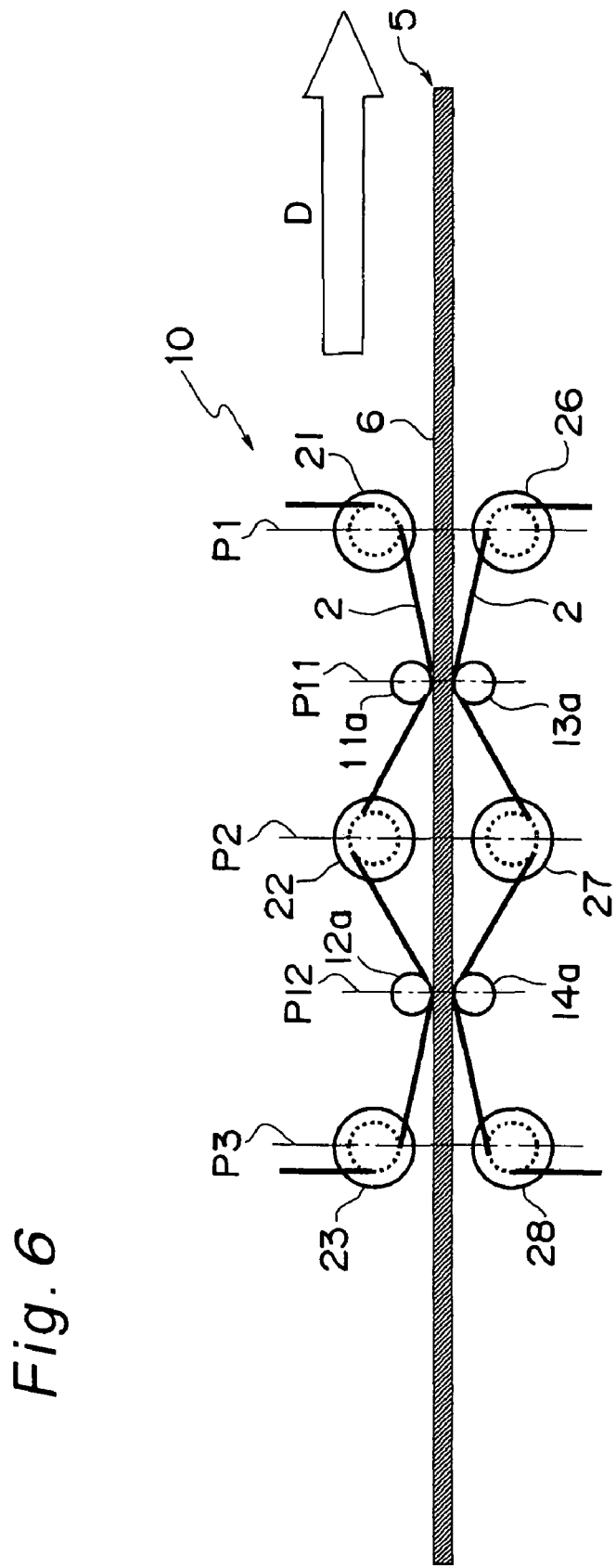
FIG. 6 is a schematic explanatory view showing the operation of the cleaning process in the terminal cleaning apparatus of the first embodiment in a state in which the cleaning process is being carried out.
Figure 8A:
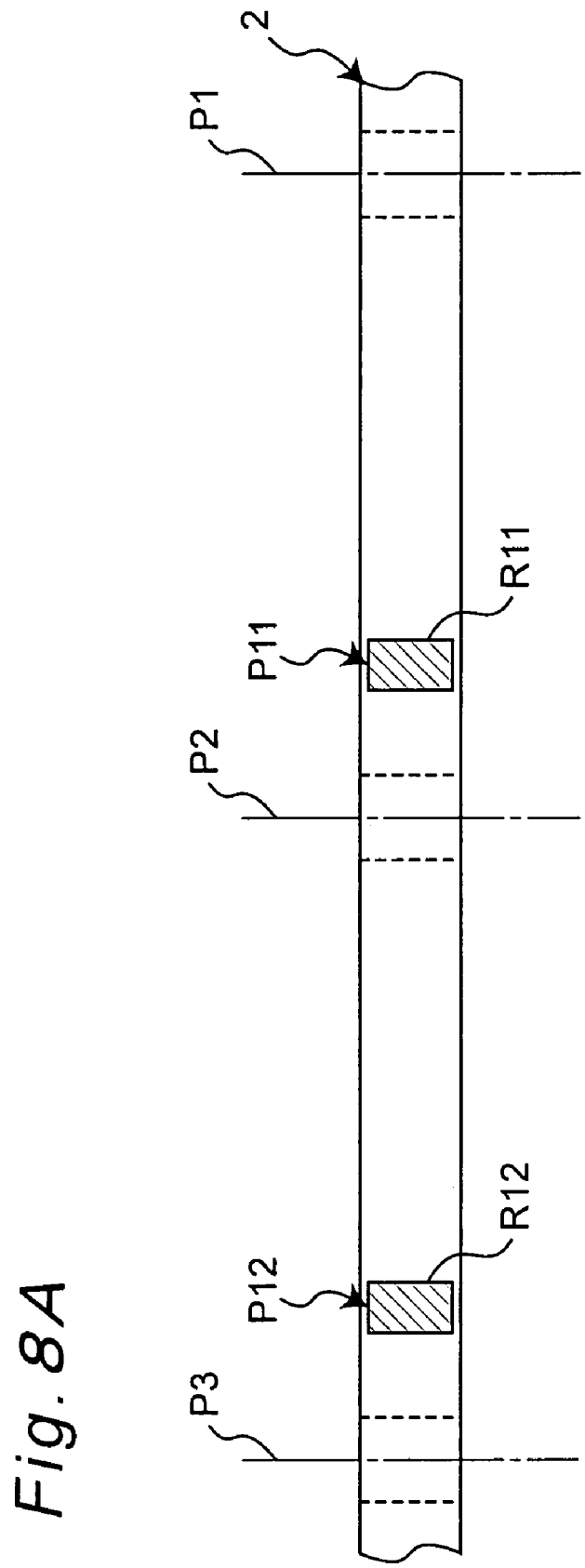
FIG. 8A is a schematic explanatory view showing the arrangement of contact regions of a cleaning cloth in the cleaning process in a state in which the cleaning process of FIG. 5 is started.
Figure 8B:
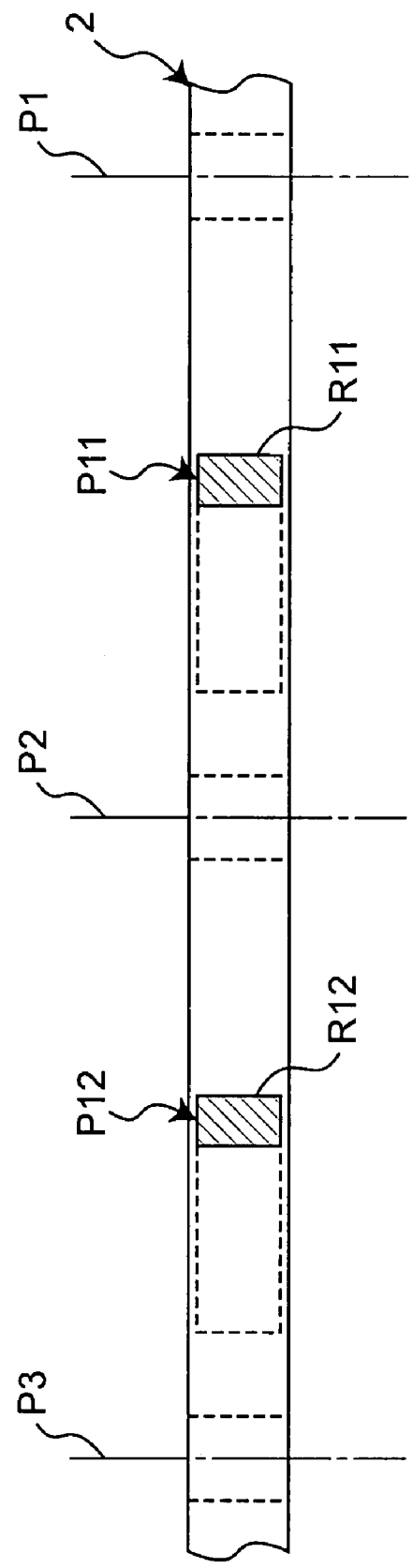
FIG. 8B is a schematic explanatory view showing the arrangement of the contact regions of the cleaning cloth in the cleaning process continued from FIG. 8A in a state in which the cleaning process of FIG. 6 is being carried out.
Figure 8C:
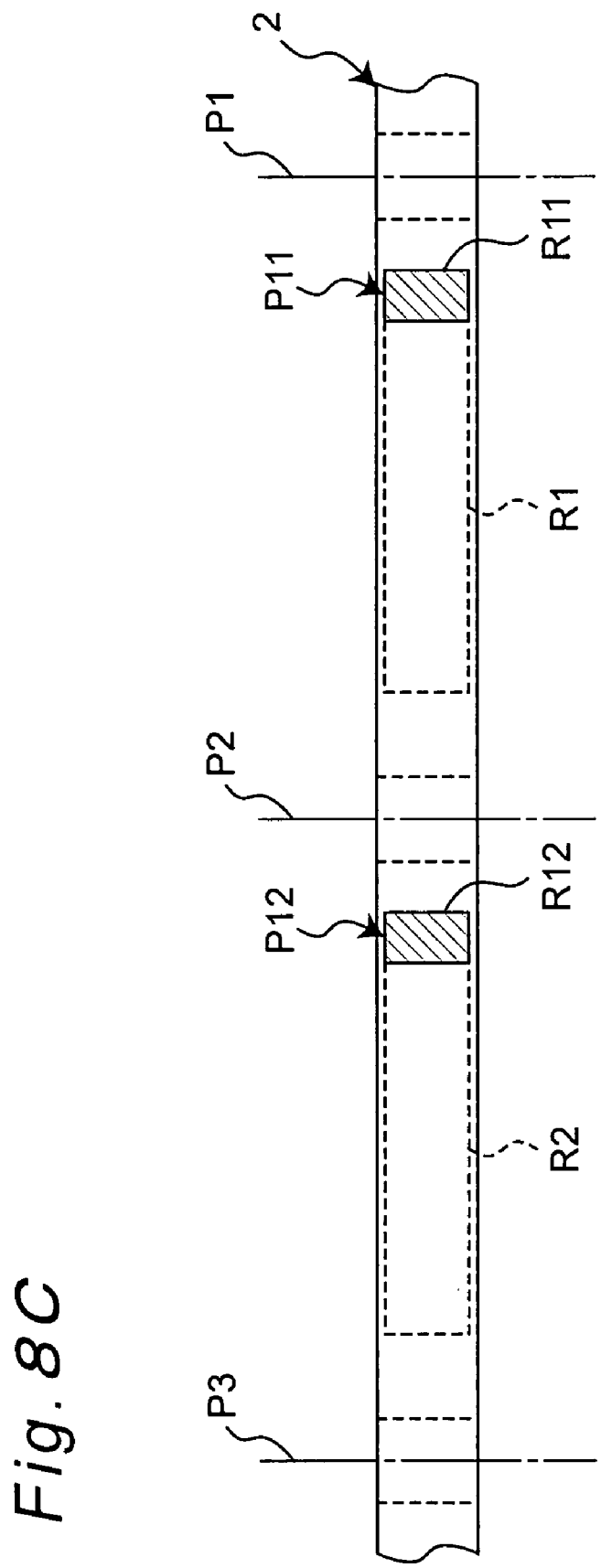
FIG. 8C is a schematic explanatory view showing the arrangement of the contact regions of the cleaning cloth in the cleaning process continued from FIG. 8B in a state in which the cleaning process of FIG. 7 is completed.

In this case, positional changes of the contact positions P11 and P12 of the cleaning cloth 2 used in the cleaning process by the cleaning unit 10 are shown in the schematic explanatory views of FIGS. 8A through 8C in correspondence with the states shown in FIGS. 5 through 7. The state shown in FIG. 8A corresponds to the state of FIG. 5, the state shown in FIG. 8B corresponds to the state of FIG. 6, and the state shown in FIG. 8C corresponds to the state of FIG. 7.

First of all, as shown in FIG. 8A, regarding the cleaning cloth 2 when the cleaning process is started, the contact region R11 brought in contact with the terminal portion 6 in the position P11 is located in a position close to the second position P2, and the contact region R12 brought in contact with the terminal portion 6 in the position P12 is located in a position close to the third position P3.

Subsequently, the head rollers 11a through 14a are moved at the movement velocity V2 in the cleaning direction D relatively to the respective rollers 21 through 23 and 26 through 28, so that the contact regions R11 and R12 are moved toward the cleaning direction D as shown in FIG. 8B.

Further subsequently, regarding the cleaning cloth 2 when the cleaning process is completed, the contact region R11 is located in a position close to the first position P1, and the contact region R12 is located in a position close to the second position P2.

As a consequence of the movement of the contact regions R11 and R12 during the cleaning process as described above, the track region R1 of the contact region R11 is located extended between the first position P1 and the second position P2, and the track region R2 of the contact region R12 is located extended between the second position P2 and the third position P3. Therefore, instead of using only the limited region of part of the cleaning cloth while the cleaning operation by the movement of the head is being carried out by the movement of the head or the like as in the conventional cleaning method, wiping cleaning can be achieved consistently with the unused portion while varying the contact positions P11 and P12 brought in contact with the terminal portion 6, and the cleaning cloth 2 can be totally efficiently used without waste. Therefore, a terminal cleaning apparatus 101 that is able to efficiently use the cleaning cloth while enabling the cleaning with high cleanliness can be provided.

Moreover, in the terminal cleaning apparatus 101 as described above, the portion of the cleaning cloth 2 brought in contact with the terminal portion 6 can consistently be a different surface during the movement of the head rollers 11a through 14a with respect to the terminal portion 6. Therefore, the soil wiped off once can reliably be prevented from readhering to the terminal portion 6, and this is suitable for the cleaning process of the terminal portions of LCD panels that have been upsized in recent years.

As shown in FIG. 8C, it is preferable to set the positions P1 through P3 and set the movement velocities V1 and V2 so that the movement track R1 of the contact region R11 falls within a range between the first position P1 and the second position P2 and the movement track R2 of the contact region R12 falls within a range between the second position P2 and the third position P3 at the point of time when the cleaning process is completed.

Figure 9A:
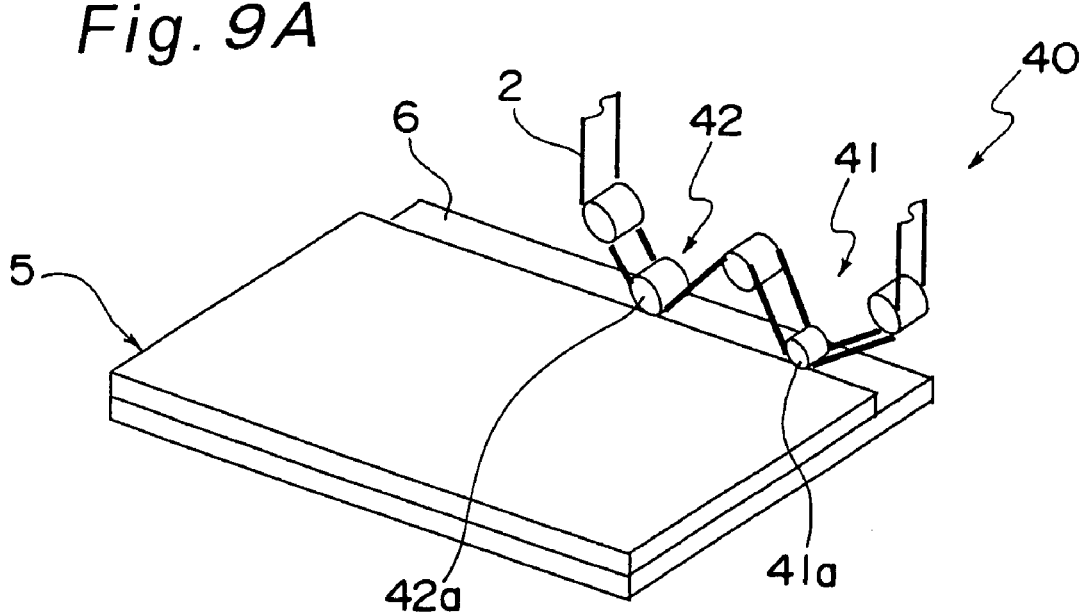
FIG. 9A is a schematic explanatory view showing a modification example of the cleaning unit of the first embodiment, where the whole cleaning unit is illustrated.

The cleaning unit 10 of the present first embodiment is not limited to the structure as described above, and various other structures can be adopted. For example, as in a cleaning unit 40 shown in the schematic explanatory view of FIGS. 9A, 9B and 9C, the head roller 41a of the first cleaning head 41 and the head roller 42a of the second cleaning head 42 may have mutually different structures.

Figure 9B:
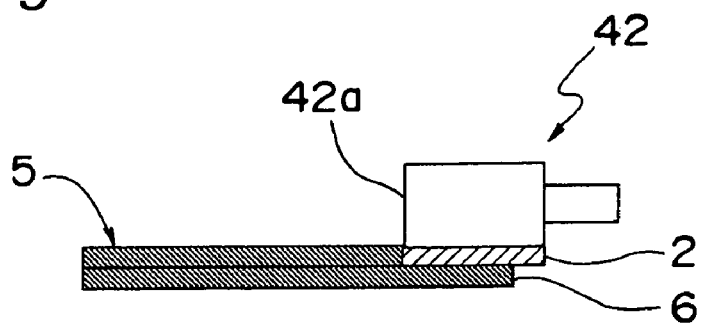
FIG. 9B is a schematic explanatory view showing a modification example of the cleaning unit of the first embodiment, where a second cleaning head is illustrated.
Figure 9C:
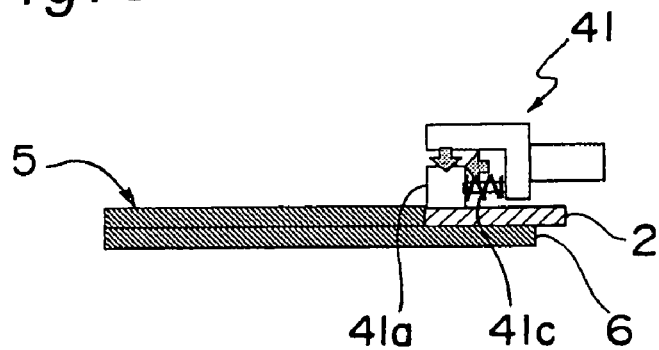
FIG. 9C is a schematic explanatory view showing a modification example of the cleaning unit of the first embodiment, where a first cleaning head is illustrated.

In concrete, a structure such that a small-size roller for cleaning principally the corner portions of the terminal portion 6 is employed as a head roller 41a of the first cleaning head 41 as shown in FIG. 9C, and a large-size roller for totally cleaning the entire surface of the terminal portion 6 is employed as a head roller 42a of the second cleaning head 42 as shown in FIG. 9B is adopted.

By adopting the structure as described above, the corner portions where the soil is hardly wiped off can be cleaned reliably with high accuracy at the terminal portion 6 of the board 5. By employing a spring member 41c that urges the small-size head roller 41 toward the corner portions of the terminal portion 6 as shown in FIG. 9C, the cleaning effect of the corner portions can further be improved.

Moreover, it is acceptable to adopt a structure such that the head roller 11a of the first cleaning head 11 and the head roller 12a of the second cleaning head 12 are arranged differently in position in the Y-axis direction.

Particularly when the terminal portion 6 has a large region width in the Y-axis direction, a reliable cleaning process for the entire region can be achieved by making the two head rollers 11a and 12a differ in position as described above.

Moreover, it is acceptable to adopt a structure such the head roller 11a of the first cleaning head 11 and the head roller 12a of the second cleaning head 12 are made mutually different not only in size but also in type itself. For example, it is acceptable to make one head roller have a roller shape and make the other head roller have a blade-like shape or a brush-like shape. In this case, the structure can cope with more diversified cleaning modes and cope with the cleaning processes of various kinds of boards.

Moreover, according to the description of the cleaning process with reference to FIGS. 5 through 7, the cleaning process is started in the state in which the contact position P12 of the head roller 12a of the second cleaning head 12 is located at the end portion of the terminal portion 6 of the board 5. However, the cleaning process of the present first embodiment is not limited only to the case. It may be a case where the cleaning process is started in, for example, a state in which the contact position P11 of the head roller 11a of the first cleaning head 11 is located at the end portion of the terminal portion 6 of the board 5 in FIG. 5.

Moreover, instead of the case where the cleaning process is completed in the state in which the contact position P11 of the head roller 11a of the first cleaning head 11 is located at the end portion of the terminal portion 6 of the board 5, it may be a case where the cleaning process is completed in a state in which the cleaning unit 10 is further moved and the contact position P12 of the head roller 12a of the second cleaning head 12 is located at the end portion of the terminal portion 6 of the board 5 likewise as shown in FIG. 7. In this case, the entire region of the terminal portion 6 can be wiped two times in the cleaning direction D, and the cleanability can be improved.

Moreover, according to the above description, the case where the movement direction of the cleaning heads 11 and 12 by the cleaning head moving unit 30 is the same direction as the cleaning direction D in the cleaning process. However, the present invention is not limited only to this case, and it may be a case where the head portions move in a direction opposite to the cleaning direction D. However, as shown in FIGS. 5 through 7, it is preferable to move the head portions in the same direction as the cleaning direction D from the viewpoint that the moving range of the cleaning unit 10 by the unit-moving unit 31 can be reduced and the time required for the cleaning process can be shortened and from the viewpoint that the whole terminal cleaning apparatus 101 is downsized. It may be a case where the first cleaning head 11 and the second cleaning head 12 are moved in different directions without limitation to the case where the head portions are moved in the same direction.

Although the case where the cleaning head moving unit 30 is fixed to the main frame 25 and the main frame 25 is moved by the unit-moving unit 31 has been described, it may be a case where the shifters 30 and 31 are provided mutually independently in place of the case. If the relation that the movement velocity Va of the rollers 21 through 23 and 26 through 28 and the movement velocity Vb of the respective head rollers 11a through 14a are mutually different holds, the effect of the present first embodiment can be obtained regardless of the superior-subordinate relationship of the shifters.

Although the case where the cleaning process is carried out by fixing the board 5 held by the board support stage 7 and moving the cleaning unit 10 with respect to the board 5 in the terminal cleaning apparatus 101 of the present first embodiment has been described, the present invention is not limited to the case. It may be a case where the cleaning unit 10 is fixed and the board 5 is moved by the board support stage 7 instead of the case. The above is because the relative movement of both of them for the cleaning process can be performed even in the case.

Second Embodiment

The present invention is not limited to the above embodiment but allowed to be implemented in other various modes. For example, a schematic explanatory view showing a partial structure of a cleaning unit 110 provided for a terminal cleaning apparatus according to the second embodiment of the present invention is shown in FIG. 10.

Figure 10:
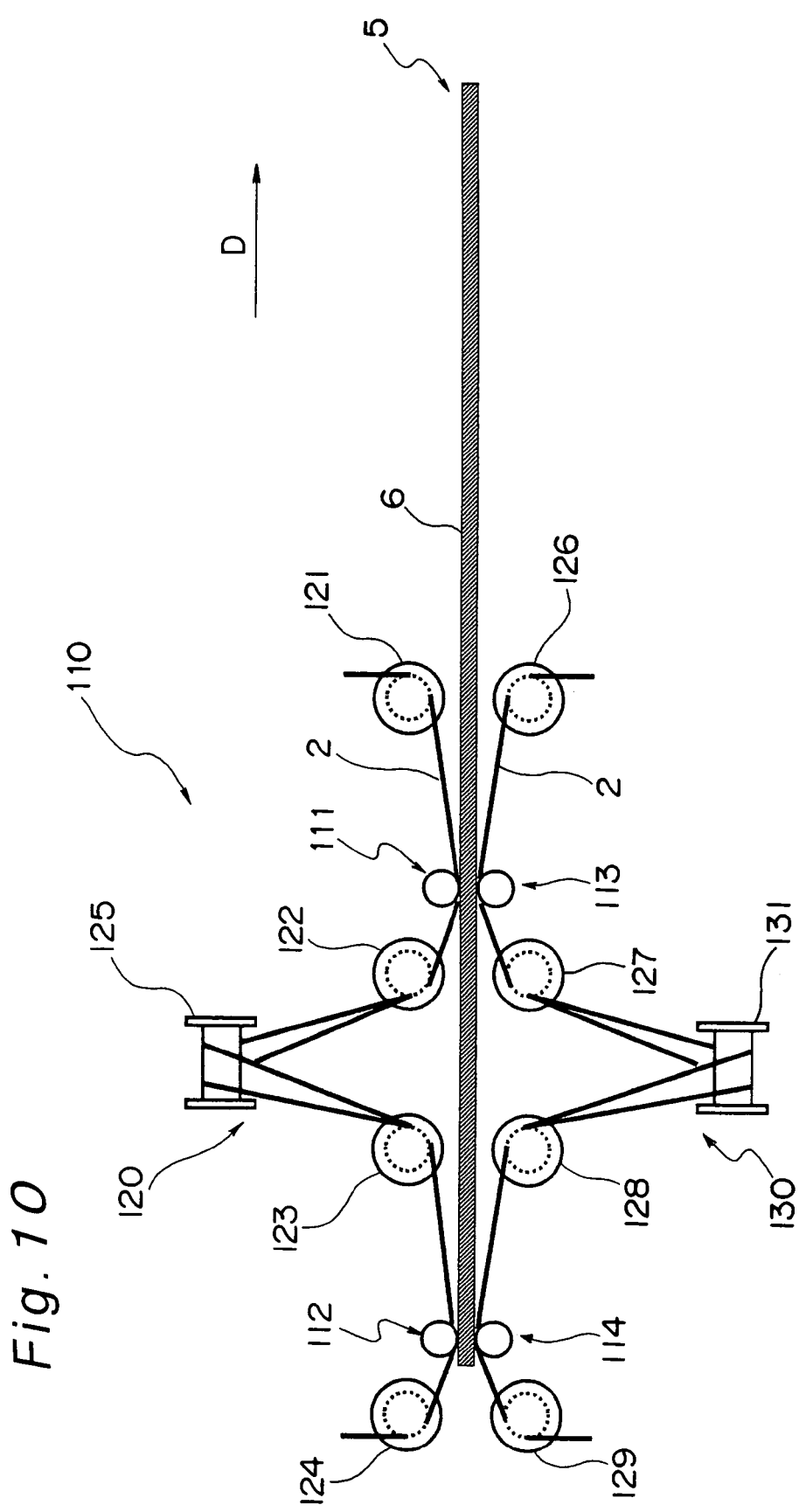
FIG. 10 is a schematic structural view showing the structure of a cleaning unit according to a second embodiment of the present invention.

As shown in FIG. 10, the cleaning unit 110 has a structure differing from that of the cleaning unit 10 of the first embodiment in that a twisting mechanism 120 for reversing the front surface and the back surface of the cleaning cloth 2 so that a contact surface of the cleaning cloth 2 brought in contact with the terminal portion 6 of the board 5 by a first cleaning head 111 and a contact surface of the cleaning cloth 2 brought in contact with the terminal portion 6 by a second cleaning head 112 are mutually turned inside out.

In concrete, as shown in FIG. 10, the cleaning unit 110 has four rollers 121, 122, 123 and 124 that guidably support the run of the fed portioning cleaning cloth 2 in the constituent part on the upper surface side as well as a twisting roller 125 that is arranged in a direction differing by an angle of 90 degrees from the rollers 121 through 124 and turns the front surface and the back surface inside out while supporting the cleaning cloth 2 supported between the rollers 122 and 123 arranged in the vicinity of the center. That is, the twisting mechanism 120 that turns the cleaning cloth 2 inside out is constituted of the two rollers 122 and 123 located in the vicinity of the center and the twisting roller 125.

Moreover, as shown in FIG. 10, a symmetrical structure is provided with interposition of the board 5 in a structural portion on the lower surface side of the cleaning unit 110, where four rollers 126 through 129 and a twisting roller 131 are provided, constituting a twisting mechanism 130 of the two rollers 127 and 128 located in the vicinity of the center and the twisting roller 131.

By virtue of the provision of the twisting mechanisms 120 and 130 as described above, the contact surface of the cleaning cloth 2 brought in contact with the terminal portion 6 by the first cleaning head 111 and the contact surface of the cleaning cloth 2 brought in contact with the terminal portion 6 by the second cleaning head 112 can be turned inside out, and the contact surface of the cleaning cloth 2 brought in contact with the terminal portion 6 by the third cleaning head 113 and the contact surface of the cleaning cloth 2 brought in contact with the terminal portion 6 by the fourth cleaning head 114 can be turned inside out. Therefore, the back surface of the cleaning cloth 2 that has been used by, for example, the first cleaning head 111 can be used by the second cleaning head 112, allowing the cleaning cloth 2 to be used more efficiently while keeping a satisfactory cleaning accuracy.

It is to be noted that, by properly combining the arbitrary embodiments of the aforementioned various embodiments, the effects possessed by them can be produced.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The entire disclosure of Japanese Patent Application No. 2005-105943 filed on Apr. 1, 2005, including specification, drawings, and claims, are incorporated herein by reference in its entirety.

The invention claimed is:

1. A board terminal cleaning method for cleaning a terminal portion formed in a strip shape on a surface of a board by moving a belt-shaped cleaning member along the terminal portion while bringing the cleaning member in contact with the terminal portion, the method comprising:

moving, in a first position spaced apart from a surface of the terminal portion of the board and a second position spaced apart from the first position in a direction along the terminal portion, the first and second positions and the cleaning member at a first movement velocity with respect to the board while supporting the cleaning member, and at the same time, moving a contact position where part of the cleaning member supported between the first position and the second position is brought in contact with the terminal portion of the board with respect to the board at a second movement velocity different from the first movement velocity in the direction along the terminal portion.

2. The board terminal cleaning method as defined in claim 1, wherein, the first and second positions and the cleaning member are moved at the first movement velocity with respect to the board in the direction along the terminal portion while further supporting the cleaning member in a third position which is spaced apart from the surface of the terminal portion and placed in the direction along the terminal portion with the first and second positions, and at the same time, a second contact position where part of the cleaning member supported between the second position and the third position is further brought in contact with the terminal portion of the board is moved with respect to the board at a third movement velocity different from the first movement velocity in the direction along the terminal portion wherein the third position is moved at the first movement velocity.

* * * * *